Patented May 15, 1945

2,376,008

UNITED STATES PATENT OFFICE 2,376,008

PRODUCTION OF LUTIDINE-UREA COMPOUNDS

George Riethof, Mount Lebanon, Pa., assignor to Pittsburgh Coke & Iron Company, Pittsburgh, Pa., a corporation of Pennsylvania No Drawing. Application August 15, 1942, Serial No. 454,998

5 Claims. (Cl. 260—290)

This invention relates to the production of lutidine-urea compounds; and it is particularly concerned with an improved method of producing crystalline lutidine-urea compounds from mixtures of alkyl pyridines which comprises treating a mixture of alkyl pyridines containing 2,6-lutidine with an aqueous solution of urea advantageously in amount sufficient to provide at least about 1 mol of urea per mol of 2,6-lutidine and advantageously an amount of water corresponding to about 15 to 20 per cent by weight of the alkyl pyridines, heating and agitating the mixture at a temperature of at least about 80° C., cooling the mixture, and recovering the crystalline lutidine-urea compound thus formed; all as more fully hereinafter set forth and as claimed.

This application is a continuation-in-part of my copending application for United States Letters Patent Serial No. 404,932, filed July 31, 1941.

Various alkyl pyridines such as the picolines and lutidines are produced in the destructive distillation of coal and are present in the basic coal tar oils. Some of these compounds are difficult to recover as pure compounds by fractional distillation because of their closely spaced boiling points and, consequently, are customarily marketed as mixtures having certain boiling ranges. One such commercial product known as the beta-picoline cut, boiling between 137° and 145° C., contains in addition to beta-picoline relatively large amounts of gamma-picoline and 2,6-latidine. A typical beta-picoline cut contains about 70 per cent of beta- and gamma-picoline together and about 30 per cent of 2,6-lutidine. Such a cut of basic coal tar oils is a good source of 2,6-lutidine and is so utilized in the present invention.

In my copending application Serial No. 404,932, I have described my discovery that 2,6-lutidine has a characteristic reaction with urea, forming under certain conditions a crystalline compound which is not very soluble in water. This compound contains urea combined with 2,6-lutidine in a molar ratio of 2:1. The crystals include some water of crystallization; probably about 1 mol. I have described also the use of this discovery in a method for the separation of 2,6-lutidine from a beta-picoline cut containing it, in which an aqueous solution of urea and a commercial beta-picoline cut are warmed together at a temperature below 80° C. until a clear solution is obtained; the solution is then cooled and the urea-lutidine compound is crystallized out; the crystals are separated from the mother liquor and purified by washing; and the mother liquor is worked up to recover the picolines.

The recovery of the picolines from the mother liquor obtained in this manner requires distilling off the picolines and water from the urea and separation of the water from the picolines in the distillate by treatment with caustic soda and redistillation. Because of the relatively large amount of urea and water present in the mother liquor, considerable difficulty and expense are involved in recovery of the picolines contained therein.

It is an object achieved by the present invention to provide an improved process for the recovery of the 2,6-lutidine-urea compound by treatment of a beta-picoline cut with urea wherein the mother liquor separated from the crystalline product contains only a small amount of water and urea, and may be easily worked up for the recovery of its picoline content.

According to the improved process of my present invention, the mixture of the picoline cut, urea and water is heated to a temperature of at least 80° C., usually 85° to 90° C. When heated to temperatures within this range, instead of forming a uniform solution, the reaction mass usually separates into two layers, an upper oily layer and a lower aqueous layer. I have found that both of these layers contain lutidine-urea compound which can be crystallized out upon cooling. However, the predominant amount of the lutidine-urea compound is contained in the upper oily layer, from which it may be recovered in an amount about equal to the yield obtained from a uniform reaction mass such as is obtained when the temperature is maintained below 80° C. The crystals recoverable from the lower aqueous layer are usually combined with relatively large amounts of urea from which they can be separated only with difficulty. It is generally more desirable, therefore, to use the lower aqueous layer with the addition of the required amount of urea and water in the treatment of further quantities of the alkyl pyridine mixture. The upper oily layer contains only about 15 to 20 per cent of water with a correspondingly low content of urea. Thus the mother liquor obtained after crystallizing out the urea-lutidine compound from the oily layer contains relatively small amounts of water and urea and may be more easily worked up to recover its picoline content than the mother liquor obtained when temperatures below 80° C. are used.

I have found it advantageous also in carrying out the formation of the lutidine-urea compound at temperatures of at least about 80° C. according to the method of the present invention, to limit the amount of water mixed with the alkyl pyridines so that the mixture has approximately the same water content as the upper oily layer obtained on heating a mixture containing a relatively large amount of water to a temperature of at least 80° C. Thus, by limiting the water added to the alkyl pyridines to an amount corresponding to about 15 to 20 per cent by weight of the alkyl pyridines, a mixture corresponding in composition to that of the upper oily layer may be obtained, which upon heating to a temperature of about 80 to 90° C. does not separate into layers. Upon cooling, the lutidine-urea compound can be crystallized out of the uniform solution thus obtained and there remains a mother liquor containing a relatively small amount of water and urea as in the case of the upper oily layer. This mother liquor may be readily worked up for recovery of its picoline values.

A particular advantage in recovering the lutidine-urea compound from a mixture having a low water content is the fact that by cooling the mixture to relatively low temperatures, for example 0° C., the yield of lutidine-urea crystals can be substantially increased.

The crystalline urea-lutidine recovered by the present process contains urea combined with lutidine in a molar ratio of 2:1 and about 1 mol of water of crystallization. A product of this composition is obtained even when the urea and the lutidine are present in the reaction mixture in a molar ratio as low as 1:1. Thus, while a molar ratio of urea to 2,6-lutidine in the reaction mixture as low as 1:1 may be used, a ratio between 1:1 and 2:1 is usually more advantageous to effect a greater yield of the desired lutidine-urea compound.

In the following examples there are illustrated several embodiments of the improved method of producing the lutidine-urea compound of the present invention:

*Example I.*—A commercial picoline cut having a boiling range of 137° to 145° C. and containing approximately 35 per cent beta-picoline, 35 per cent gamma-picoline and 30 per cent 2,6-lutidine was mixed with an aqueous urea solution prepared by dissolving 180 grams of urea in 120 cc. of water. About 280 grams of the picoline cut were mixed with the urea solution. The mixture was agitated and heated to a temperature of about 85° C. The mixture was then settled and allowed to separate into two layers, an upper oily layer containing the bulk of the picoline cut, and a lower aqueous layer containing most of the excess urea. The layers were separated and cooled to crystallize out the lutidine-urea compound. The crystal crops from the upper layer amounted to about 102 grams. The solution remaining after crystallization of the lutidine-urea compound from the upper oily layer contained about 10 per cent of urea and 20 per cent of water, and the residual beta- and gamma-picolines and a small amount of 2,6-lutidine. The lower aqueous layer contained a small amount of the lutidine-urea compound and most of the excess urea.

*Example II.*—In this experiment the picoline cut was mixed with an aqueous urea solution as in Example I except that the amount of water incorporated in the mixture was limited to 15 per cent by weight of the picoline cut, so that a reaction mixture was obtained having approximately the composition of the upper oily layer obtained in Example I. The reaction mixture contained 1000 grams of beta-picoline cut, 150 grams of water and 230 grams of urea. The reaction mixture was agitated and heated at a temperature of about 85° C. No separation of the reaction mixture took place. It was cooled and the lutidine-urea compound crystallized out. A yield of 300 grams of crystals was obtained.

While this invention has been described herein with reference to certain specific embodiments thereof, it is to be understood that the invention is not limited to the details of such embodiments except as hereinafter defined in the appended claims.

What I claim is:

1. A process of producing a 2,6-lutidene-urea compound from mixtures of alkyl pyridines containing 2,6-lutidine comprising treating the mixture of alkyl pyridine with an aqueous solution of urea, heating and agitating the reaction mixture at a temperature above approximately 80° with sufficient water to form an oily body containing the lutidine-urea compound and about 15–20% water, said oily body forming a supernatant layer when more than about 20% water is present, cooling the reaction mixture and recovering the crystalline lutidine-urea compound thus formed.

2. A process of producing 2,6-lutidine-urea compounds from mixtures of alkyl pyridines containing 2,6-lutidine comprising treating the mixture of alkyl pyridines with an aqueous solution of urea in amount sufficient to provide at least one mol of urea per mol of 2,6-lutidine, heating and agitating the reaction mixture at a temperature above approximately 80° with sufficient water to form an oily body containing the lutidine-urea compound and about 15–20% water, said oily body forming a supernatant layer when more than about 20% water is present, cooling the reaction mixture and recovering the crystalline lutidine-urea compound thus formed.

3. A process of producing lutidine-urea compounds from mixtures of alkyl pyridines containing 2,6-lutidine comprising treating the mixture of alkyl pyridines with an aqueous solution of urea in amount sufficient to provide at least one mol of urea per mol of 2,6-lutidine and an amount of water corresponding to about 15 to 20 per cent by weight of the alkyl pyridines, heating and agitating the reaction mixture at a temperature above approximately 80° with sufficient water to form an oily body containing the lutidine-urea compound and about 15–20% water, said oily body forming a supernatant layer when more than about 20% water is present, cooling the reaction mixture and recovering the crystalline lutidine-urea compound thus formed.

4. A process of producing lutidine-urea compounds from mixtures of alkyl pyridine containing 2,6-lutidine comprising treating the mixture of alkyl pyridines with an aqueous solution of urea in amount sufficient to provide at least one mol of urea per mol of 2,6-lutidine, heating and agitating the reaction mixture at a temperature above approximately 80° with sufficient water to form an oily body as a supernatant layer containing the lutidine-urea compound and about 15–20% water, and a lower aqueous layer, settling the reaction mixture, separating the lower aqueous layer from the upper oily layer thus formed, cooling the upper oily layer, and recovering the crystalline lutidine-urea compound thus formed.

5. A process of producing lutidine-urea compounds from mixtures of alkyl pyridine containing 2,6-lutidine comprising treating the mixture of alkyl pyridines with an aqueous solution of urea in amount sufficient to provide at least one mol of urea per mol of 2,6-lutidine, heating and agitating the reaction mixture at a temperature above approximately 80° with sufficient water to form an oily body as a supernatant layer containing the lutidine-urea compound and about 15-20% water, and a lower aqueous layer, settling the reaction mixture, separating the lower aqueous layer from the upper oily layer thus formed, cooling the upper oily layer, and recovering the crystalline lutidine-urea compound thus formed, and treating another quantity of the mixture of alkyl pyridines with the lower aqueous layer in admixture with additional urea and water.

GEORGE RIETHOF.